United States Patent
Course et al.

(10) Patent No.: US 10,572,866 B2
(45) Date of Patent: *Feb. 25, 2020

(54) TRANSACTION VERIFICATION SYSTEM

(71) Applicant: CULLINAN CONSULTING GROUP PTY LTD, Melbourne (AU)

(72) Inventors: Philip Leslie Course, Melbourne (AU); Frank Ajzensztat, Armidale (AU); Wens Peter Brinkman, Sandringham (AU)

(73) Assignee: Cullinan Consulting Group Pty Ltd., Melbourne (AU)

( * ) Notice: Subject to any disclaimer, the term of this patent is extended or adjusted under 35 U.S.C. 154(b) by 184 days.

This patent is subject to a terminal disclaimer.

(21) Appl. No.: 15/827,602

(22) Filed: Nov. 30, 2017

(65) Prior Publication Data

US 2018/0082275 A1 Mar. 22, 2018

Related U.S. Application Data

(63) Continuation of application No. 13/843,359, filed on Mar. 15, 2013, now Pat. No. 9,836,733.

(51) Int. Cl.
*G06Q 20/20* (2012.01)
*G07F 17/42* (2006.01)

(52) U.S. Cl.
CPC .......... *G06Q 20/206* (2013.01); *G06Q 20/20* (2013.01); *G06Q 20/209* (2013.01); *G07F 17/42* (2013.01)

(58) Field of Classification Search
CPC .... G06Q 20/206; G06Q 20/20; G06Q 20/209; G07F 17/42

(Continued)

(56) References Cited

U.S. PATENT DOCUMENTS 6,502,747 B1   1/2003   Stoutenburg
7,258,268 B2   8/2007   Steiger
(Continued)

FOREIGN PATENT DOCUMENTS

JP        2003-288649      10/2003
WO   WO 2006/093598       9/2006
(Continued)

OTHER PUBLICATIONS

Office action from Australian Patent Application No. 2013201672 dated Feb. 19, 2014.
(Continued)

*Primary Examiner* — Vanel Frenel
(74) *Attorney, Agent, or Firm* — Knobbe, Martens Olson & Bear, LLP

(57) ABSTRACT

A financial transaction system includes a governing host having a database for registering parties wishing to perform a financial transaction and processing the financial transaction. A discrete point-of-sale (POS) terminal interfaces with one party wishing to initiate a financial transaction with another party. The discrete POS terminal has a local transaction process providing for initial validating and enforcing of business rules governing the transaction with the one party and generating a transaction key confirming that the transaction is authorised on validating the transaction with the governing host. A facilitator device reads the transaction key on being supplied with same by the one party and communicates with the governing host to complete the transaction using the facilitator POS terminal. The discrete POS terminal is located separately and can be accessed and operated independently by the one party offline of any point-of-sale activity involving the facilitator point-of-sale terminal and the facilitator device.

19 Claims, 11 Drawing Sheets

(58) Field of Classification Search
USPC ............ 705/18, 16, 21, 39, 40, 44; 235/380, 235/375; 370/329; 455/406; 709/220, 709/223
See application file for complete search history.

(56) References Cited

U.S. PATENT DOCUMENTS

| | | | |
|---|---|---|---|
| 7,461,776 | B2 | 1/2008 | Steiger |
| 7,641,113 | B1 | 1/2010 | Alvarez |
| 7,685,067 | B1 | 3/2010 | Britto |
| 7,735,125 | B1 | 6/2010 | Alvarez |
| 7,798,397 | B2 | 9/2010 | Henry |
| 8,028,901 | B2 | 2/2011 | Henry |
| 8,332,317 | B1 | 12/2012 | McCoy |
| 8,453,923 | B2 | 6/2013 | Henry |
| 8,463,702 | B2 | 6/2013 | Bennett |
| 8,733,636 | B2 | 5/2014 | Henry |
| 8,998,079 | B2 | 4/2015 | Henry |
| 9,171,297 | B2 | 7/2015 | Henry |
| 9,367,838 | B2 | 3/2016 | Henry |
| 2003/0212629 | A1 | 11/2003 | King |
| 2007/0075129 | A1 | 4/2007 | Hanna |
| 2010/0100426 | A1 | 4/2010 | Sander |
| 2012/0074216 | A1 | 3/2012 | Henry |
| 2012/0290477 | A1 | 11/2012 | Clausen |
| 2012/0303524 | A1 | 11/2012 | Bertram |
| 2013/0179342 | A1 | 7/2013 | Clausen |
| 2016/0034865 | A1 | 2/2016 | Henry |
| 2017/0011376 | A1 | 1/2017 | Henry |

FOREIGN PATENT DOCUMENTS

| | | |
|---|---|---|
| WO | WO 2008/118089 | 10/2008 |
| WO | WO 2013/184159 | 12/2013 |
| WO | WO 2013/191722 | 12/2013 |

OTHER PUBLICATIONS

Office action from Australian Patent Application No. 2013201672 dated Mar. 26, 2014.
Office action from Australian Patent Application No. 2013201672 dated May 14, 2014.
Office action from Australian Patent Application No. 2013201672 dated Jul. 29, 2014.
Anti-Money Laundering and Counter-Terrorism Financing Act 2006 prepared by the Office of Legislative Drafting and Publishing (OLDP) dated Apr. 20, 2007.
Dodd-Frank Wall Street Reform and Consumer Protection Act, by Senate and House of Representatives of the USA in Congress, H.R. 4173, Jan. 5, 2010, 848 pages.
Know Your Customer (KYC) by Australian Government, dated Dec. 12, 2008, 14 pages.

TRANSACTION VERIFICATION SYSTEM

RELATED APPLICATION

This application is a continuation of U.S. application Ser. No. 13/843,359, filed Mar. 15, 2013, now U.S. Pat. No. 9,836,733, the disclosure of which is considered part of this application, and is hereby incorporated by reference in its entirety.

FIELD OF THE INVENTION

This invention relates to financial transactions between parties involving a merchant with point-of-sale facilities to enable the transaction. The invention has particular, although not exclusive, utility with respect to effecting money transfers between parties at high traffic flow retailers such as convenience stores.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

High traffic flow retailers such as convenience store retailers must have a fast counter transaction time. Unlike banks or post offices, the customer expectation is fast service.

Financial transactions normally require a number of reasonably complex validation and compliance processes to be performed by staff. Consequently staff members have generally required a high level of skill and training to perform financial transactions over the counter. This tends to run counter to the business model adopted by most convenience stores, which is focused on low level skill and training requirements and very low numbers of staff Convenience stores are not accustomed to high levels of compliance, fraud and cash management risk. They are also not able to hold large amounts of cash in the till due to the risk of robbery.

Consequently, convenience store retailers adopt a business model where all transactional activity is incorporated into their Point of Sale systems in preference to stand-alone systems that create difficulties when balancing and reconciling store activity. System integration projects that may be able to overcome some of these problems are usually complex, expensive and time consuming.

Given these problems, convenience store retailers have used various systems for performing financial transactions, each having their own drawbacks in one form or another. These include:

1. Paper based forms—The advantage of paper based forms systems is that they are low cost. Disadvantages are that they are slow and require a high level of staff training. They tend to fail in the convenience store environment mostly due to slow transaction times and the lack of integration with Point of Sale systems. Complex training requirements means long implementation cycles; and long transaction times at the store counter means that complex financial transactions cannot be done in high traffic convenience store environments.

2. Point of sale data entry—The advantage of this form of entry is that the transaction can be completed successfully at the counter. Disadvantages are that it is slow and requires a high level of staff training. It tends to fail in the convenience store environment mostly due to slow transaction times. As with paper based forms, complex training requirements means long implementation cycles.

3. Staging the transaction with a telephone request then point of sale completion—The advantage of this system is the staging of transactions which reduces the time at the counter. The disadvantages are that the system requires extensive use of a call centre and language difficulties can make the data collected inaccurate. It fails in a convenience store environment due to lack of customer acceptance of this method, the costs of running helpdesk and the lack of integration with Point of Sale systems.

4. Complete self-service solution on an ATM or other device that can take payment—The advantage is that there is no problem with counter time. The disadvantages are high capital costs of hardware and difficulty verifying customer identity for compliance purposes. It fails in a convenience store environment due to:

high capital costs and cash collection and management costs;

the lack of integration with Point of Sale systems and long implementation cycles; and the fact that consumers do not feel comfortable handing their money to a machine.

With the pressure on convenience store merchants to offer more extensive service offerings that are becoming available in the financial services area, such as the ability for their customers to perform complex financial transactions involving foreign currency exchanges, the training requirements for merchants and their staff alike are required to increase, which runs counter to the business model being adopted for their success.

The seminal problem that needs to be overcome is that the onus is presently on the merchant or staff member to review transaction histories of customers and decide themselves as to what is suspicious and potentially fraudulent activity and what is not in advance or whilst a transaction is in progress

DISCLOSURE OF THE INVENTION

It is an object of the present invention to overcome or mitigate at least some of the problems identified above associated with the performance of reasonably complex financial transactions involving a merchant and customer that is capable of being performed in a high flow retail environment.

In accordance with one aspect of the present invention, there is provided a financial transaction system for enabling financial transactions between parties using a facilitator, including:

a governing host having a database for registering parties wishing to perform a financial transaction and for ultimately processing the financial transaction;

a discrete point-of-sale terminal independently accessible by one party wishing to initiate a financial transaction with another party and for communicating with the governing host to process the transaction, the discrete point-of-sale terminal having a local transaction process providing for the initial validating and enforcing of business rules governing the transaction with the one party and to generate a transaction key confirming that the transaction is authorised on validating the transaction with the governing host;
a facilitator device for completing the business transaction at a facilitator point-of-sale terminal, the facilitator device reading the transaction key on being supplied with same by the one party and communicating with the governing host to complete the transaction using the facilitator point-of-sale terminal;
wherein the discrete point-of-sale terminal is located separately and can be accessed and operated independently by the one party, offline of any point-of-sale activity involving the facilitator point-of-sale terminal and the facilitator device.

Preferably, the facilitator device is integrated into the facilitator point-of-sale terminal.

Preferably, the local transaction process includes a customer registration process, a send money transaction process, a receive money transaction process, or a foreign exchange enquiry process.

Preferably, the discrete point-of-sale terminal and governing host provide for the operation of supplemental transaction processes, including a reconciliation transaction process, a problem resolution transaction process, a network management transaction process and a network upgrade transaction process to facilitate and support the operation of the financial transaction system.

Preferably, the governing host system includes fraud detection means to analyse patterns of transactions that may be fraudulent or non-compliant and to alert when detecting same.

Preferably, the facilitator device, at the end of some transactions loads a banking card for the one party with sums of money that the one party can then use to withdraw at an automatic teller or other money dispensing machine.

In accordance with another aspect of the present invention, there is provided a method for enabling financial transactions between parties including:
registering one party for performing a financial transaction offline from any point-of-sale activity;
receiving a request from a registered party wishing to initiate a particular type of financial transaction with another party locally of the other party but offline of any point-of-sale activity involving the other party;
communicating with a governing host to process the transaction using a local transaction process providing for the initial validating and enforcing of business rules governing the transaction with the one party;
generating a transaction key confirming that the transaction is authorized on validating the transaction with the governing host;
the transaction key being provided to the other party to complete the transaction, the other party accessing point-of-sale services to effect the transaction communicating with the governing host as appropriate to validate the transaction.

Preferably, the method includes delivering point-of-sale material and displaying instructions, terms and conditions to the one party in the party's own language.

Preferably, the method includes conducting physical checks by the other party based on the electronic delivery of instructions to the other party by the governing host.

Preferably, the method includes receiving alerts of fraudulent or non-compliant transactions from the governing host, analyzing the request in relation to same, and alerting when detecting same.

Preferably, the method includes at the end of some transactions, loading a banking card with sums of money that a customer can then use to withdraw at an automatic teller or other money dispensing machine.

BRIEF DESCRIPTION OF THE DRAWINGS

The drawings referred to in the Best Mode(s) for Carrying Out the Invention are as follows.

BEST MODE(S) FOR CARRYING OUT THE INVENTION

Figure 1:
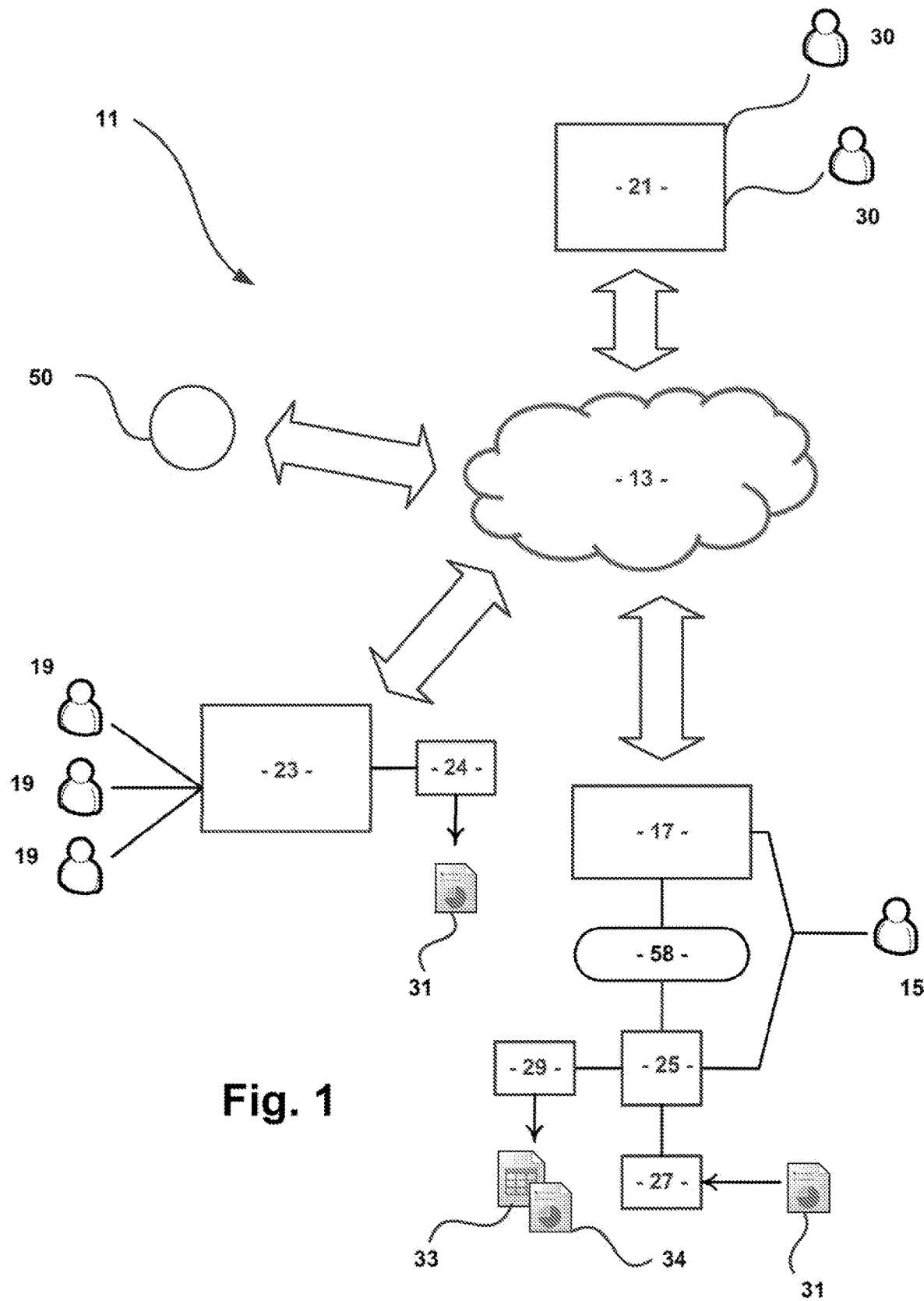
FIG. 1 is a structural block diagram showing the structure of the financial transaction system.

The best mode for carrying out the invention is described according to one specific embodiment. The embodiment is directed towards a financial transaction system 11 comprising three discrete systems communicating with each other via a cloud based network host system using a network in the form of the Internet 13. It should be appreciated that in other embodiments a dedicated LAN or WAN network can be used other than the Internet. The financial transaction system 11 is specifically adapted to servicing a chain of convenience store merchants 15 where each convenience store has a standard point-of-sale terminal 17 manned by a staff member of the merchant for serving customers 19. For the purposes of the ensuing description of the system, the merchant and staff member will be treated synonymously and will both be referred to by the reference numeral 15 in the drawings.

The Financial Transaction System 11 Includes:
a governing host system 21 that is remotely located of the convenience stores 15 on the Internet 13 and having a database for registering parties wishing to perform financial transactions with particular merchants;
a discrete point-of-sale terminal in the form of a self-service electronic kiosk 23 and printer 24 located in each convenience store 15 and connected to the governing host via the Internet 13; and
a facilitator device 25 having a scanner 27 and printer 29 provided at the sales counter for use by the staff member 15 to facilitate and complete the processing of a financial transaction with a customer 19 who has used the services provided by the electronic kiosk 23, the staff member using the store's point-of-sale terminal 17.

In the present embodiment, the principal services provided by the electronic kiosk 23 to the customer 19 involve complex electronic financial transactions, including international money transfers to facilitate the customer paying for a transfer or receiving funds transferred to them, all through the agency of the financial transaction system 11 and the convenience store as necessary.

By using a self-service electronic kiosk 23, a facilitator device 25 and a set of applications provided by the governing host system 21, the financial transaction system 11 is designed to stage a financial transaction in two steps: firstly the customer 19 prepares the transaction at the self-service electronic kiosk 23 which collects, validates and enforces all the required business rules, producing a kiosk transaction key verifying same; then secondly the transaction is completed at the store counter by the staff member 15 on being provided with the kiosk transaction key by the customer, where mandatory physical checks and tendering is performed in a manner that is similar to, and is as simple as, selling a packet of cigarettes.

These applications can involve complex fraud detection and sophisticated inventory tracking software that normally would not be available to the merchant and can be provided as cloud based services. Thus in the present embodiment, the financial transaction system 11 includes fraud detection services having a fraud detection client application 24 operating on the electronic kiosk 23 communicating with a corresponding host service application on the governing host system 21 to analyse patterns of transactions that may be fraudulent or require further regulatory compliance action and to alert a central compliance officer when detecting same.

Before describing the functional and technical aspects of the embodiment in detail, some of the issues associated with complex financial transactions that the financial transaction system of the present embodiment addresses will be described first to gain a better appreciation of the innovative aspects of the invention.

Compliance Monitoring Automation

International money transfers are regulated by government authorities in every country. The majority of governments take their Anti Money Laundering and Counter Terrorist Financing (AML/CTF) legislation and rules from recommendations by the Financial Action Task Force (FATF) an inter-governmental body established in 1989 by the Ministers of its Member Jurisdictions.

The recommendations result in compliance requirements for each organization involved in financial services that fall under the AML/CTF rules. These compliance requirements can be quite onerous and time consuming to manage. There are usually serious penalties for non-compliance.

Convenience store retailers that offer money transfer services such as would be the case with merchants of convenience stores in the present embodiment are responsible for the monitoring of customer activity and performing the appropriate level of customer due diligence on their money transfer transactions. In addition to monitoring individual stores, the merchant is also responsible for monitoring activity across the store network.

The financial transaction system 11 provides a methodology for capturing activity in a manner that warrants on-going monitoring for compliance with AML/CTF rules, and includes processes to perform this monitoring on an immediate, weekly and monthly basis. This ensures that the merchant is meeting their AML/CTF obligations in a comprehensive and time efficient manner.

Fraud Alerts

Money transfer is a target for fraud as funds are moved quickly and irrevocably. Fraud by staff members of the merchant or by customers of the merchant can be costly. The merchants (store owners) need to have confidence that there are processes in place to identify and halt fraudulent transactions.

The financial transaction system 11 has processes for monitoring transactions in real time to identify and halt potential fraud by establishing customer and store fraud rules and halting transactions if customers or stores exceed the fraud limit parameters. The governing host system 21 includes a process for providing immediate alerts and a daily summary that identifies transactions that could constitute possible instances of fraud. In this manner, compliance events are monitored by the governing host system 21 and thus complex regulatory decisions do not need to be made by operators or staff members at the point-of-sale at the merchant's premises.

Customer Conversion Analytics and Automated Response

International money transfer is a competitive business where customers shop around for the best deal. Merchants 15 have not been able to determine if the sales volumes are being negatively impacted by competitive action. The merchant also needs to determine pricing, but is not normally able to see the sales impact of price increases or decreases at a detailed level.

The financial transaction system 11 includes processes for tracking the number of quotes against the number of transactions to arrive at a conversion rate. This conversion rate is tracked for specific "corridors" such as the sending country to the receiving country for a particular store, group of stores, region or whole business during a specified time period and provides a report of this to the merchant. By the examining the conversion rate over time, the merchant can determine where pricing adjustments need to be made.

Lost Customer Analytics and Automated Response

The majority of international money transfer customers transact regularly. Some are one time users, and some are occasional users of the service. Merchants are not able to determine when a regular customer stops transacting, so these valuable customers just disappear.

The financial transaction system 11 has a process for identifying regular customers that have stopped transacting and automatically generates a targeted offer, such as discount, coupon or other incentive, to attract the customer to return. The system 11 also includes a process for monitoring the effectiveness of this program by tracking the customers that do return.

Generalized Products Handling

Products and services that are offered to customers via an in-store electronic kiosk and facilitator device of the type described in the present embodiment would normally pose a significant problem to merchants updating the product name and hanging the counter operation process performed by the staff member. This would normally take a full software development, testing and distribution process that is time consuming and also costly for merchants.

The financial transaction system 11 includes a generalized products handling process, which allows products to be configured on the system. Instructions for store operator transaction handling are determined by this particular product configuration created by the process, which can be centrally maintained on the governing host system 21.

As indicated, each of the aforementioned problems are overcome by the financial transaction system 11 of the present embodiment and in particular its configuration and processes that have been developed with the aforementioned problems in mind.

The particular functionality of each of the aforementioned systems making up the financial transaction system 11 that enables fast and simplified processing of complex financial transactions of the type described will now be described.

The self-service electronic kiosk 23 effectively involves three functions invoked by discrete processes including:

(i) enforcing of validation and business rules when a customer registers their details and processes their transaction request at the kiosk terminal itself, separate from any interaction with the staff member at the counter of the convenience store;

(ii) storing customer details and transaction request details on the governing host system 21 with which it communicates via the Internet 13;

(iii) producing a voucher 31 with a kiosk transaction key in the form of a unique barcode in respect of the financial transaction performed at the electronic kiosk 23 for the customer to take to the store counter and for the staff member of the merchant to process the order to complete the transaction.

The governing host system 21 also performs three principal functions. It includes processes for:

(i) enforcing validation and business rules when a transaction is processed by it from a self-service electronic kiosk 23;

(ii) using the information gathered from the self-service electronic kiosk 23 to complete the transaction via interaction with the facilitator device 25 at the counter of the convenience store; and (iii) building a comprehensive database of consumer interactions for marketing, business risk management and compliance purposes.

The facilitator device 25 similarly includes five principal functions performed by discrete processes that:

(i) identify the transaction key by reading the barcode voucher 31 produced at the electronic kiosk 23 by the customer 19, by way of the scanner 27 when the customer is served and presents the voucher;

(ii) instruct the convenience store counter staff 15 on the compliance and processing steps that need to be performed and verify the business being done;

(iii) produce a sales receipt 33 using the printer 29 that has the money transfer provider reference number and which is given to the customer 19;

(iv) generate a POS transaction key 34 which is used to complete the transaction at the convenience store point-of-sale terminal 17; and (v) receive a transaction identifier which confirms completion of the transaction and binds the transaction to a POS transaction file for matching during the settlement process.

Additional functions and features included within the financial transaction system 11 that combine to make the system work in a convenience store environment to overcome the aforementioned problems are numerous. These include:

self-service aspects that enable customers to successfully use the system without training;

merchant features that enable complex financial transactions to be performed in a convenience store environment; and system management capabilities that ensure high system availability and remote support efficiency.

In the case of self-service aspects, the system includes processes that provide for:

(i) multi-lingual screen prompts to come up from which customers can select from a number of different languages;

(ii) the subsequent presentment of terms and conditions in the selected language;

(iii) the adoption of a simplified customer name being the customer's mobile number or email address;

(iv) the customer determining their password at the time that they register with the system 11 when at the self-service electronic kiosk 23;

(v) when a customer forgets their password, a facility of automatically sending a new password to the customer's mobile phone and/or email address upon correctly answering a security question previously established during the registration process;

(vi) presenting the customer with a changeable screensaver that communicates current promotions of the convenience store or other messages;

(vii) timing out customer sessions after a nominated timeframe which varies according to the function they are using whereupon the system is reset to commence a new transaction;

(viii) facilitating customer operation of the electronic kiosk 23, by the kiosk having a touchscreen keyboard that disables characters which are not valid for the specific field the customer is entering;

(ix) the kiosk having a help button that allows the customer to access to a video presentation that shows an overview of how to operate the system;

(x) the customer having access to a helpdesk operator 30 as part of the services provided by the governing host system 11, where the operator can view and remotely control the touchscreen on the kiosk to assist the customer when asked.

With respect to merchant features, these include processes for:

(i) validating the transaction as part of the process that the customer undertakes at the electronic kiosk 23, which means that the store staff do not need to perform these validation activities;

(ii) the governing host system 21 to perform fraud checking in accordance with the merchant's specific fraud profile on any financial transaction performed by a customer at the electronic kiosk 23 and blocking transactions from being processed if they do not comply with the fraud profile without necessitating involvement of the merchant;

(iii) the governing host system 21 performing compliance checking, monitoring and reporting on an on-line basis daily, weekly and monthly;

(iv) the governing host system 21 to process settlement thereby ensuring that each transaction is balanced between the store systems of the merchant and the host systems;

(v) the governing host system 21 to perform a detailed logging of all system activity to enable error detection and correction;

(vi) the governing host system 21 to perform a detailed marketing analysis enabling both the merchant and supplier of the financial transaction system 11 to improve outcomes of the operation of the convenience store by identifying trends and potential problem areas;

(vii) the electronic kiosk 23 to provide for staff training when required;

(viii) the financial transaction system 11 to continuously monitor potential fraudulent behavior patterns and trigger live alerts to mobile phones, email addresses for immediate action in response to detecting any such behaviors;

(ix) the loading of a prepaid debit card at the facilitation device 25 supplied to the customer that can be redeemed at an ATM for the customer receiving funds beyond a prescribed limit available from the convenience store to avoid the merchant having to hold large amounts of cash in the till.

With respect to system management capabilities these include processes for:

(i) the governing host system 21 monitoring all electronic kiosk 23 and facilitator devices 25 to ensure they are operational;

(ii) the governing host system 21 monitoring all printers connected to the electronic kiosk 23 to ensure they are operational;

(iii) the governing host system 21 remotely distributing software updates to the electronic kiosk 23 and facilitator devices 25;

(iv) integrating all system alerts, helpdesk emails and helpdesk phone calls into one issue management system handled by the governing host system 21;

(v) the provision of remote support and operation of the electronic kiosk 23 via the governing host system 21 while a customer is using the kiosk.

In order to perform these functions and processes, the governing host system 21 generally comprises a centralized server and database which manages and controls the delivery of instances of money transfer transactions at each electronic kiosk 23 connected to it via the Internet 13.

The basic operation of the financial transaction system 11 involves operation of a number of transaction processes available to a customer 19 at the electronic kiosk 23. These include a customer registration process 43, a send money transaction process 45, a receive money transaction process 47, a foreign exchange enquiry process 81, a reconciliation transaction process 84, a problem resolution transaction process 86, a network management transaction process 88 and a network upgrade transaction process 90.

Figure 2:
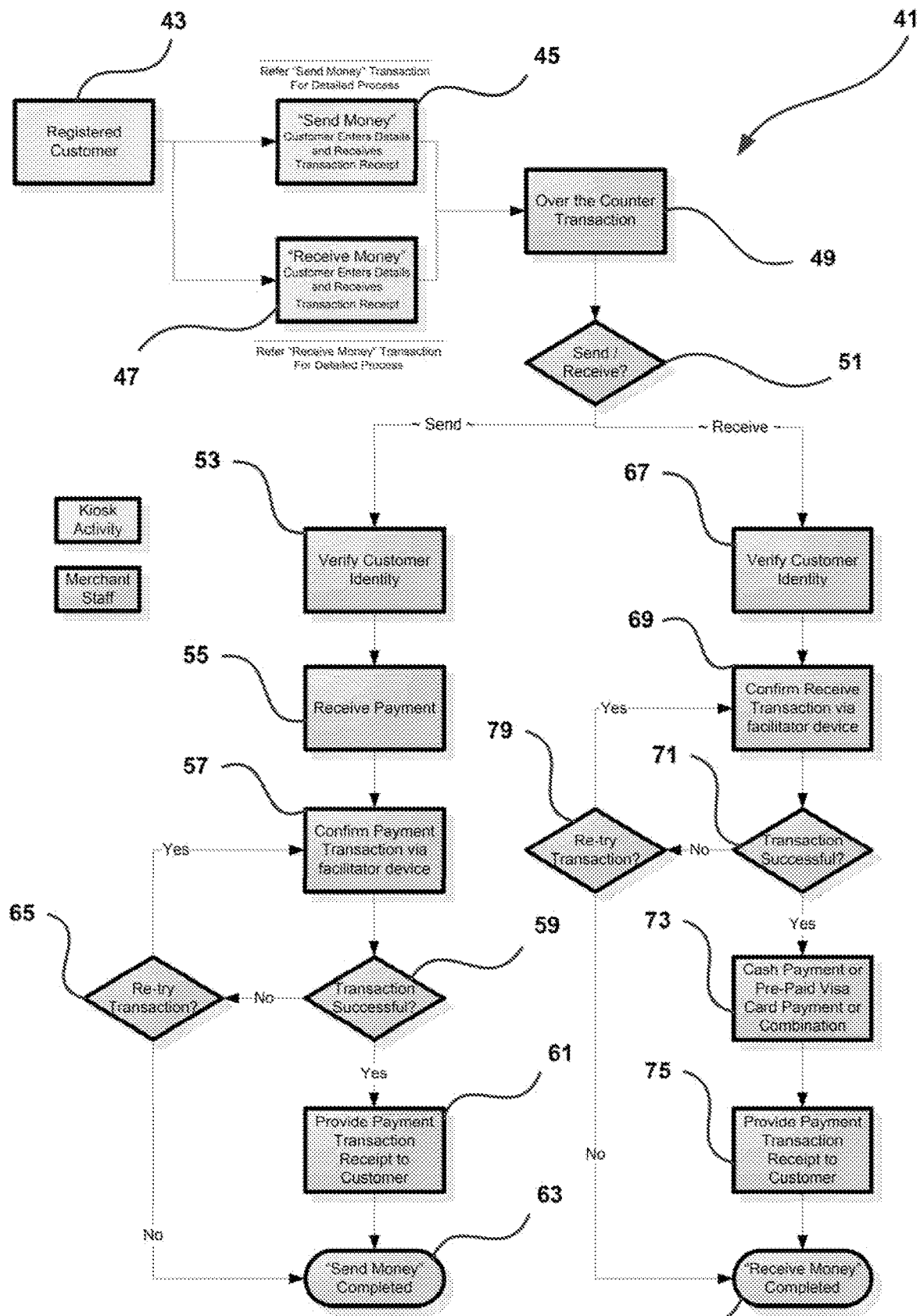
FIG. 2 is a flowchart showing an overview of the money transfer process that can be performed using an electronic kiosk and counter staff of the merchant.

An overview of the main money transfer processes that can be undertaken by a customer 19 using the electronic kiosk 23 and then involving counter staff of the merchant 15 to complete the transaction is shown in FIG. 2 of the drawings. The money transfer processes 41 basically involve three separate processes that can be performed by the customer at the kiosk, namely the customer registration process 43, the send money transaction process 45 and the receive money transaction process 47. Each of these discrete processes will be described in more detail later, however, as shown in FIG. 2, a customer 19 must first complete the customer registration process 43 before he or she can invoke either the send money transaction money process 45 or the receive money transaction process 47.

Once a customer 19 completes registration and then completes either the send money transaction process 45 or the receive money transaction process 47 at the kiosk 23, the printer 24 produces the barcode voucher 31 in relation to the particular transaction performed by the customer. The customer is then required to take the barcode voucher 31 to the service counter staff member 15 and the staff member commences effecting the transaction using the services of the facilitator device 25 at step 49.

The staff member 15 on being handed the barcode voucher 31 is required to process it by using the facilitator device 25 and scanner 27. The staff member is required to scan the barcode voucher using the scanner 27 and is then prompted via the display of the facilitator device 25 to undertake the various predetermined steps that need to be completed in order to process the transaction.

The facilitator device 25 determines from the barcode voucher 31 whether the transaction is a send money transfer or a receive money transfer and indicates to the staff member such at step 51. In the event that it is a send money transfer that needs to be performed, the staff member is prompted by the facilitator device 25 to undertake the following processes with the customer 19, the staff member confirming or cancelling the step using the okay or cancel buttons (not shown) provided on the facilitator device to progress through the transaction process. The staff member:

verifies the customer identity at step 53;

receives payment from the customer for the send money transaction at step 55;

confirms the payment transaction using the facilitator device 25 at step 57; and determines whether the transaction was successful or not at step 59.

If the transaction was successful, then the facilitator device 25 prints out a receipt 33 at the printer 29 and the staff member 15 provides the receipt 33 to the customer 19 at step 61. The transaction is completed by the facilitator device 25 using the POS transaction key 34 to record the transaction at the merchant POS terminal 17. This completes the send money transaction indicated at 63.

In the present embodiment, the operation of the facilitator device 25 is directly integrated into the merchant POS terminal 17 by using a POS API 58. In this manner, the POS transaction key 34, on being generated by the facilitator device 25 is electronically transmitted to the POS terminal 17 by the POS API 58 for recording and completion of the transaction.

In other embodiments where the merchant does not have a POS API 58 integrating the operation of the facilitator device 25 with the POS terminal 17, the facilitator device prints the POS transaction key 34 for the staff member 15, and the staff member enters the POS transaction key into the POS terminal 17 to record and complete the transaction.

If the transaction is not successful, then the staff member is prompted by the facilitator device 25 as to whether to re-try the transaction at step 65. If the staff member presses an OK button provided on the facilitator device, then the facilitator device 25 returns to the confirmation of the payment transaction step 57 and continues as before. If the staff member presses a CANCEL button provided on the facilitator device, the facilitator device 25 steps to complete the send money transaction at 63.

The payment transaction step 57 is invoked by the staff member pressing the OK button. This causes the facilitator device 25 to invoke an internal process to communicate with the governing host 21, which communicates with the money transfer provider 50. It should be appreciated that other merchants may use alternative POS interface services using different POS API's with which the internal process of the facilitator device 25 will communicate.

In the event that the transaction is a receive money transfer that needs to be performed after step 51, the staff member 15 is prompted by the facilitator device 25 to undertake the following processes with the customer 19. The staff member:

verifies the customer identity at step 67;

confirms the receive money transaction using the facilitator device 25 communicating with the particular money transfer provider of the customer at step 69; and determines whether the transaction was successful or not at step 71.

If the transaction was successful, then the facilitator device 25 prompts the staff member to indicate whether the funds are to be a cash payment to the customer or a prepaid credit card payment, or a combination of both at step 73.

From selecting the particular option, the facilitator device 25 advances to printing a payment transaction receipt 33 at the printer 29 for the customer and a POS transaction key 34 at step 75. The staff member completes the transaction by entering the POS transaction key 34 on the POS device 17. This step is required if the merchant has not implemented the POS API 58. This completes the receive money transaction as indicated at 77.

If the transaction is not successful then the staff member is prompted by the facilitator device 25 as to whether to retry the transaction at step 79. If the staff member presses the OK button, the facilitator device 25 returns to the confirmation of the receive transaction step 69 and continues as before. If the staff member presses the CANCEL button, the facilitator device 25 steps to complete the transaction at 77.

The customer registration process 43 and the foreign exchange enquiry process 81 can be invoked at the electronic kiosk 23 by a customer 19 preliminary to the customer performing the send money transaction process 45. In the case of the customer registration process 43 this would always be invoked at the outset by a first time user of the kiosk before they are able to invoke the send money transaction process 45.

Figure 3:
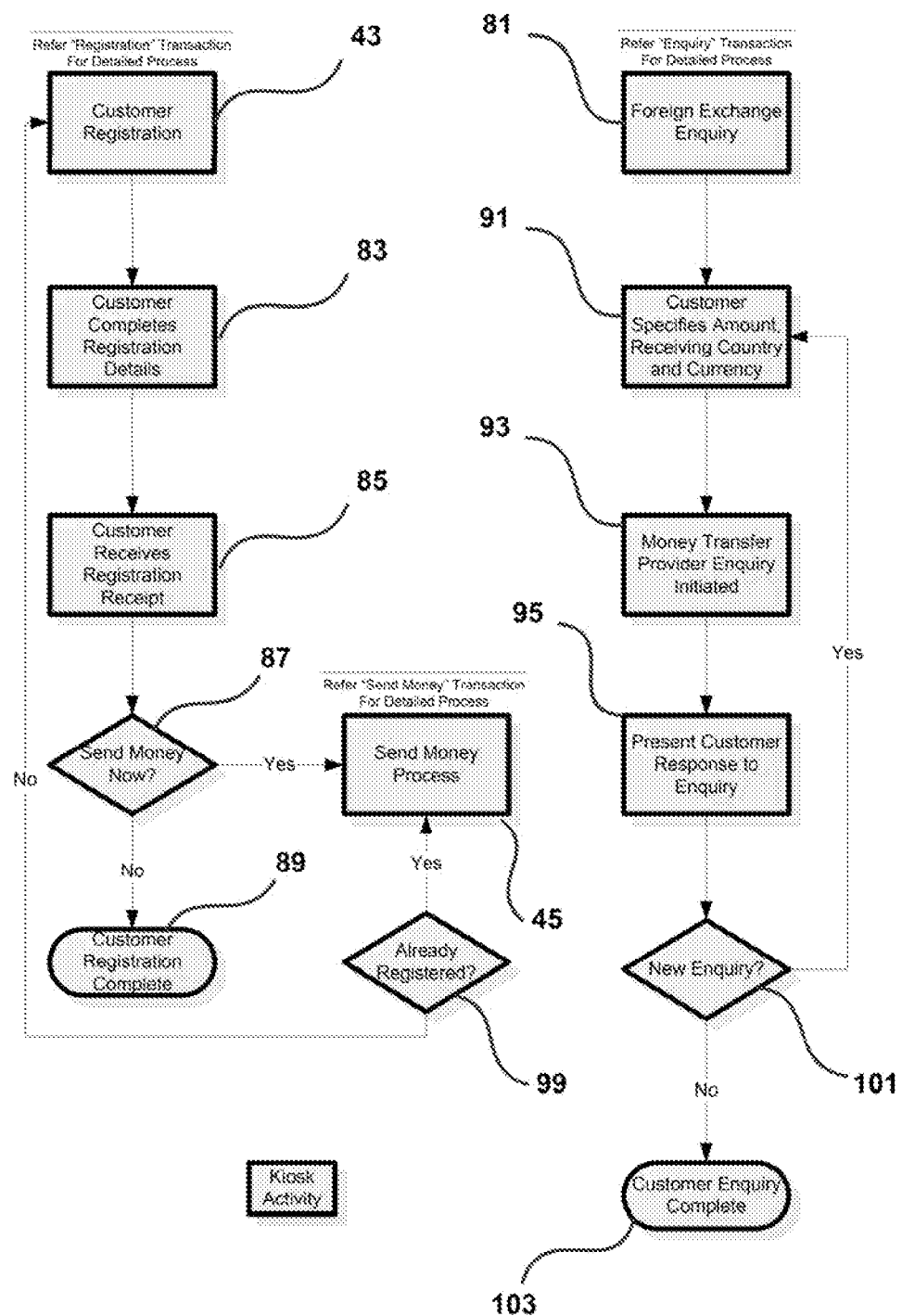
FIG. 3 is a flowchart showing the customer registration/foreign exchange enquiry process.

The customer registration process 43 and the foreign exchange enquiry process 81 will be described in more detail later, however the general process steps involved for both when invoked in a preliminary manner relative to invoking the send money transaction process 45 is shown in FIG. 3 of the drawings.

Commencing firstly with the customer registration process 43 being invoked by a customer 19 and the customer completing registration details at step 83, the electronic kiosk 23 operates the printer 24 to print a registration receipt at step 85. The customer is then prompted at 87 as to whether they wish to send money now or end the process. If the customer presses the OK button, the electronic kiosk advances to invoking the send money transaction process 45 as shown. Alternatively, if the customer presses the CANCEL button, the electronic kiosk 23 advances to complete the registration process at 89.

With the foreign exchange enquiry process 81 being invoked by a customer 19, the electronic kiosk 23 advances to requesting the customer to specify the amount, the receiving country and receiving currencies for the enquiry at 91. On providing this information, the money transfer provider enquiry is initiated at 93 and presents the customer with a response to the enquiry at 95. The kiosk 23 prompts the customer as to whether they wish to conduct a new enquiry at 101. If the customer answers in the affirmative by pressing the OK button, the program returns to prompting the customer for the amount and currency at step 91. Alternatively, if the customer responds to the enquiry 101 in the negative by pressing the CANCEL button, the program advances to complete the enquiry stage at 103.

Figure 4:
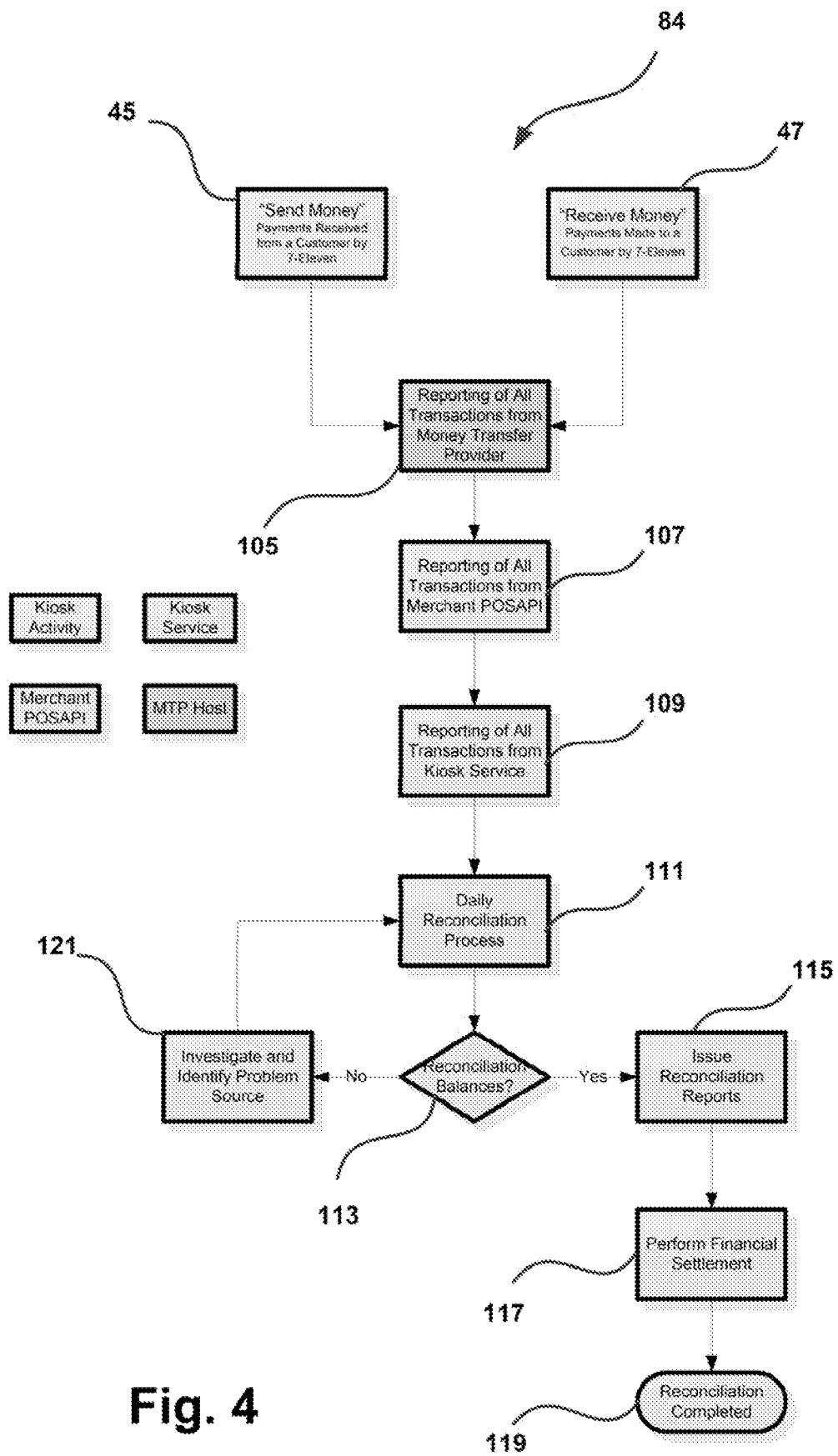
FIG. 4 is a flowchart showing the reconciliation transaction process.

As is mandatory with all financial systems, the financial transaction system 11 is able to reconcile all transactions made at the electronic kiosk 23 and which have been transacted over the counter by operation of the reconciliation transaction process 84. This is shown in more detail at FIG. 4 of the drawings and is performed automatically on a daily basis in response to all send money transactions 45 which comprise all payments received from customers by the merchant during the last 24 hours or over a prescribed period of time and all receive money transactions 47 which comprise all payments made to customers by the merchant during the same time. The reconciliation process involves reporting functions performed by the money transfer provider 50 at 105, the POS API 58 of the merchant POS terminal at 107, and the governing host system 21 at 109. These respective reports are collated at 111 on a daily basis and reconciled to determine whether they balance at 113. If the reports do balance, a reconciliation report is issued at 115 and a financial settlement between the various service providers is performed at 117. The reconciliation transaction process is then completed at 119. In the event that the reconciliation results in the reports not balancing at 113, then the process steps to investigating and identifying the problem source at 121 and returns to performing the daily reconciliation process 111 again on rectifying the problem.

Figure 5:
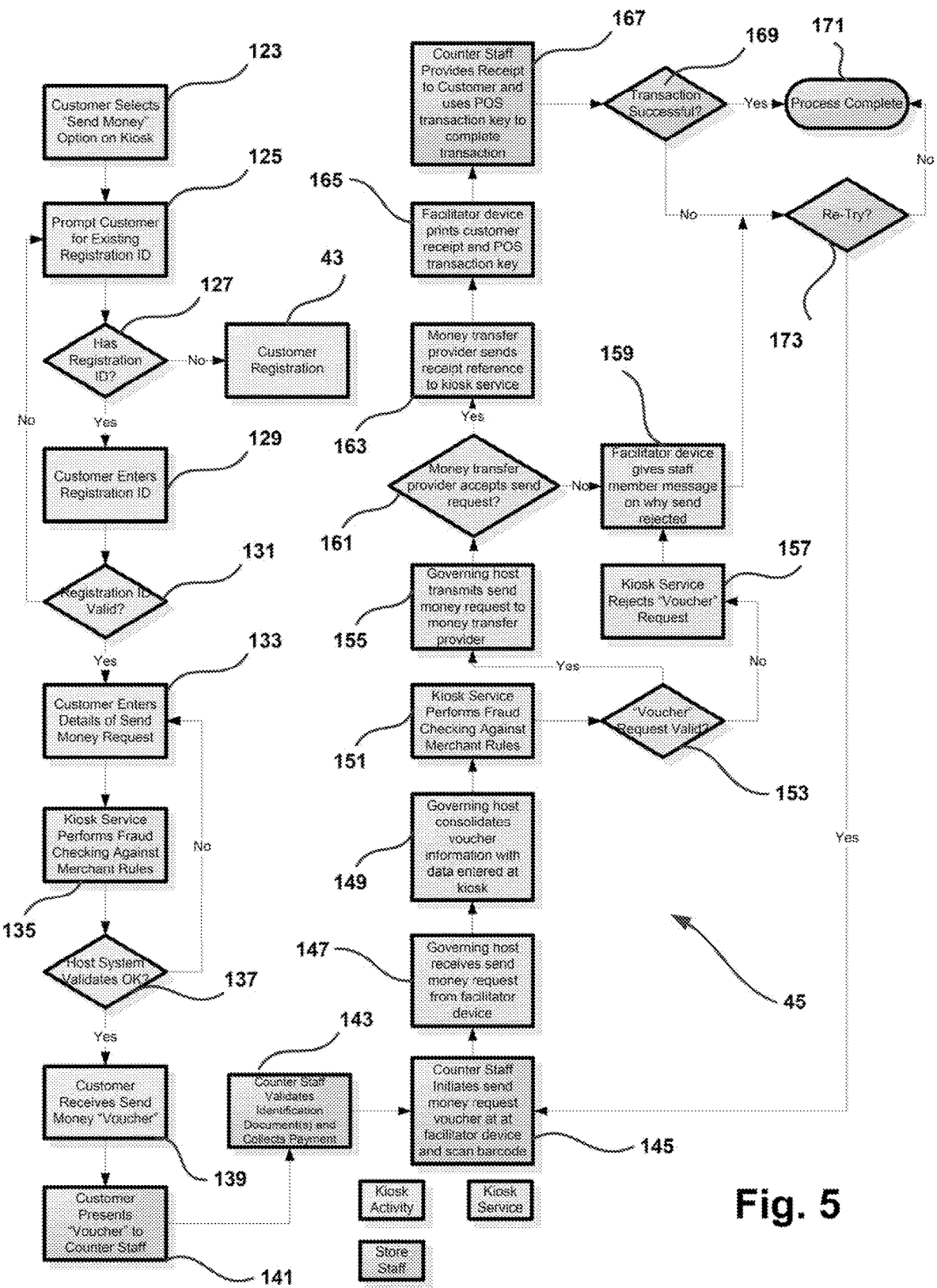
FIG. 5 is a flowchart showing the send money transaction process.

Now describing the send money transaction process 45 in more detail, reference is made to FIG. 5 of the drawings. As shown, the send money transaction process 45 on being invoked by the customer selecting the send money option at the kiosk at step 123, prompts the customer for existing registration identification at 125 and advances to receiving either an affirmative or negative response by the customer at 127. If the customer responds by pressing the CANCEL button indicating that they do not have the registration ID, then the process steps to invoking the customer registration process 43. Alternatively, if the customer affirms that they have their registration ID, the program steps to the customer entering their registration ID at 129 and the system ascertaining whether the registration ID is valid at 131. If it is not valid, the program returns to prompting the customer again for their existing registration ID at 125. Alternatively, if the system determines that the registration ID is valid, the program steps to prompting the customer to enter details of the send money request at 133. All of these steps are representative of activity at the kiosk.

On the customer 19 entering their details at 133, the kiosk 23 communicates with the governing host system 21 to conduct fraud checking processes 135 and proceeds with the transaction depending upon whether the host system advises that the transaction is to be validated or not at 137. If not, the program returns to prompting the customer to enter details of the send money request again at 133, whereby the process for validating the transaction or is repeated. If the host system validates the transaction, then the program advances to the electronic kiosk 23 printing the send money barcode voucher 31 at the printer 24 containing the transaction key at step 139 and the customer is prompted to present the voucher to counter staff.

On the customer presenting the barcode voucher 31 to the merchant's counter staff at 141, the staff member proceeds to validate the identification documents provided by the customer and collects payment from the customer at 143. The counter staff member then initiates the send money request by scanning the barcode voucher at step 145 using the facilitator device 25. The governing host 21 then receives the voucher request at 147. The host system 21 consolidates the voucher information with the customer registration and send money request data entered by the customer 19 at the kiosk 23 at 149. The kiosk service provided by the host system then performs fraud checking against the rules set for the merchant transactions at 151 and ascertains whether the voucher request is valid at 153. If so, the governing host 21 completes the transaction using the money transfer provider interface 50 at 155. If the voucher request is not valid, the kiosk service rejects the voucher request at 157 and steps to sending a reject message to the facilitator device 25 at 159.

If the send money request proceeds successfully at 161 the money transfer provider interface 50 provides a money transfer reference number to the governing host system 21 which sends a receipt to the facilitator device 25 in respect of the send money transaction at 163. If the send money request does not proceed successfully, the money transfer provider interface 50 directs the kiosk service to send a reject message to the facilitator device 25 at 159. The facilitator device 25 at step 165 indicates to the counter staff member to provide the receipt to the customer and process the sale at the merchant POS 17 using the POS transaction key 34 at 167. If the transaction was successful at 169, process is completed at 171. If the transaction was not successful at 169, the counter staff member is prompted as to whether they wish to retry the transaction at 173. If it is decided not to retry the transaction, then the process is completed at 171. Alternatively, if it is decided to retry the transaction, the counter staff member proceeds to initiate a send money request once more at 145 by scanning the barcode voucher 31 using the scanner 27 of the facilitator device 25 and the process is repeated once more.

Figure 6:
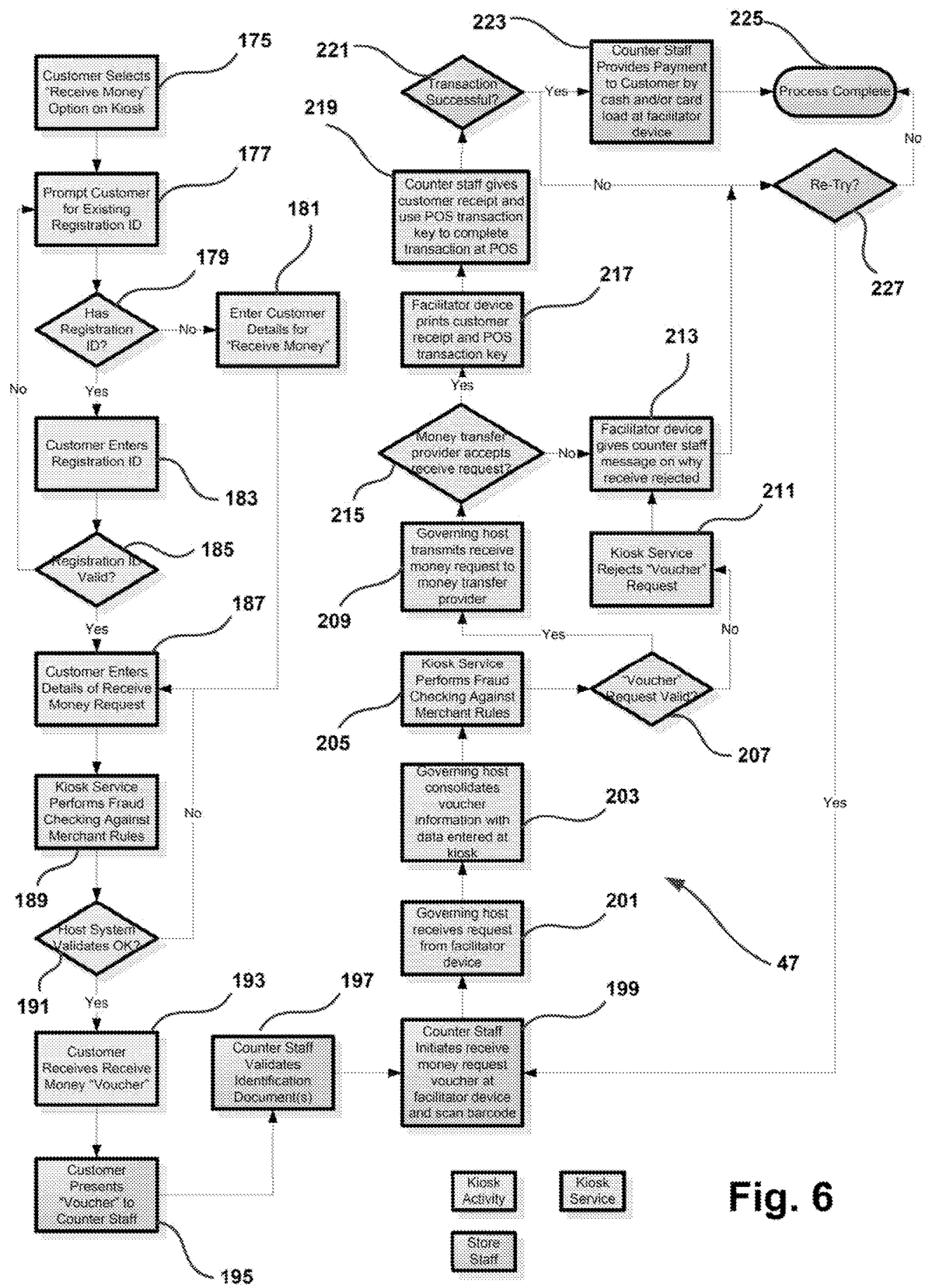
FIG. 6 is a flowchart showing the receive money transaction process.

The receive money transaction process 47 is shown in detail at FIG. 6 of the drawings and is invoked by the customer selecting the receive money option provided at the electronic kiosk at 175.

As in the send money process 45, the customer is prompted for their existing identification for using the system at 177. If the customer does not have their registration identification at 179, the customer is prompted to enter details for the receive money process at 181. In the event that the customer does have their registration ID at 179, the customer enters their registration details at 183 and the system proceeds with checking whether the registration ID is valid or not at 185. If the registration ID is not valid, the program returns to prompting the customer for their existing registration identification once more at 177 and proceeds as before. If the registration ID is valid at 185, or if the customer is prompted for entering details for receiving money at 181, the program steps to the customer entering details of the receive money request at 187. The kiosk service of the governing host system is then invoked to perform fraud checking in accordance with the rules governing the transactions of the particular merchant at 189. The governing host system 21 ascertains whether the transaction is valid and informs the kiosk as to whether it is appropriate to proceed at 191. If the transaction is not validated at this stage, the program returns to requiring the customer to enter the details of the receive money request again at 187.

If the transaction is validated at 191, the barcode voucher 31 is printed by the printer 24 at the kiosk 23 and received by the customer at 193. The customer then presents the voucher to the counter staff member of the merchant at 195, whereupon the counter staff member validates the identification documents provided by the customer at 197. The counter staff member then initiates the receive money request by scanning the voucher 31 at the scanner 27 of the facilitator device 25 at step 199. The governing host 21 then receives the voucher request at 201. The governing host 21consolidates the voucher information with the customer registration and receive money request data entered by the customer 19 at the kiosk 23 at 203. The kiosk service performs fraud checking against the rules applying to transactions of the particular merchant at 205 and determines whether the voucher request is valid or not at 207. If the voucher request is valid, the governing host 21 completes the transaction using the money transfer provider interface 50 at 209. If it is not valid, the kiosk service rejects the voucher request at 211 and sends a reject message to the facilitator device 25 at 213. Similarly, if the money transfer provider interface 50 determines that the receive money request is not successful at 215, the kiosk service similarly is prompted at 213 to send a reject message to the facilitator device 25.

If the receive money request at 215 is successful, then the kiosk service sends a receipt and a POS transaction key to the facilitator device 25 at 217. If the transaction is successful at step 221, the counter staff member is prompted to provide payment to the customer at step 223 and completes the process shown in the overview 41 at FIG. 2 of the drawings, at which stage the process is completed at 225. On the other hand, if the transaction is not successful, then the staff member is prompted to retry the transaction at 227. If the staff member chooses not to retry the transaction, then the process is completed at step 225, or alternatively if the staff member decides to retry the transaction, then the staff member initiates the receive money request and scans the barcode voucher 31 once more at step 199, repeating the aforementioned process steps again.

Figure 7:
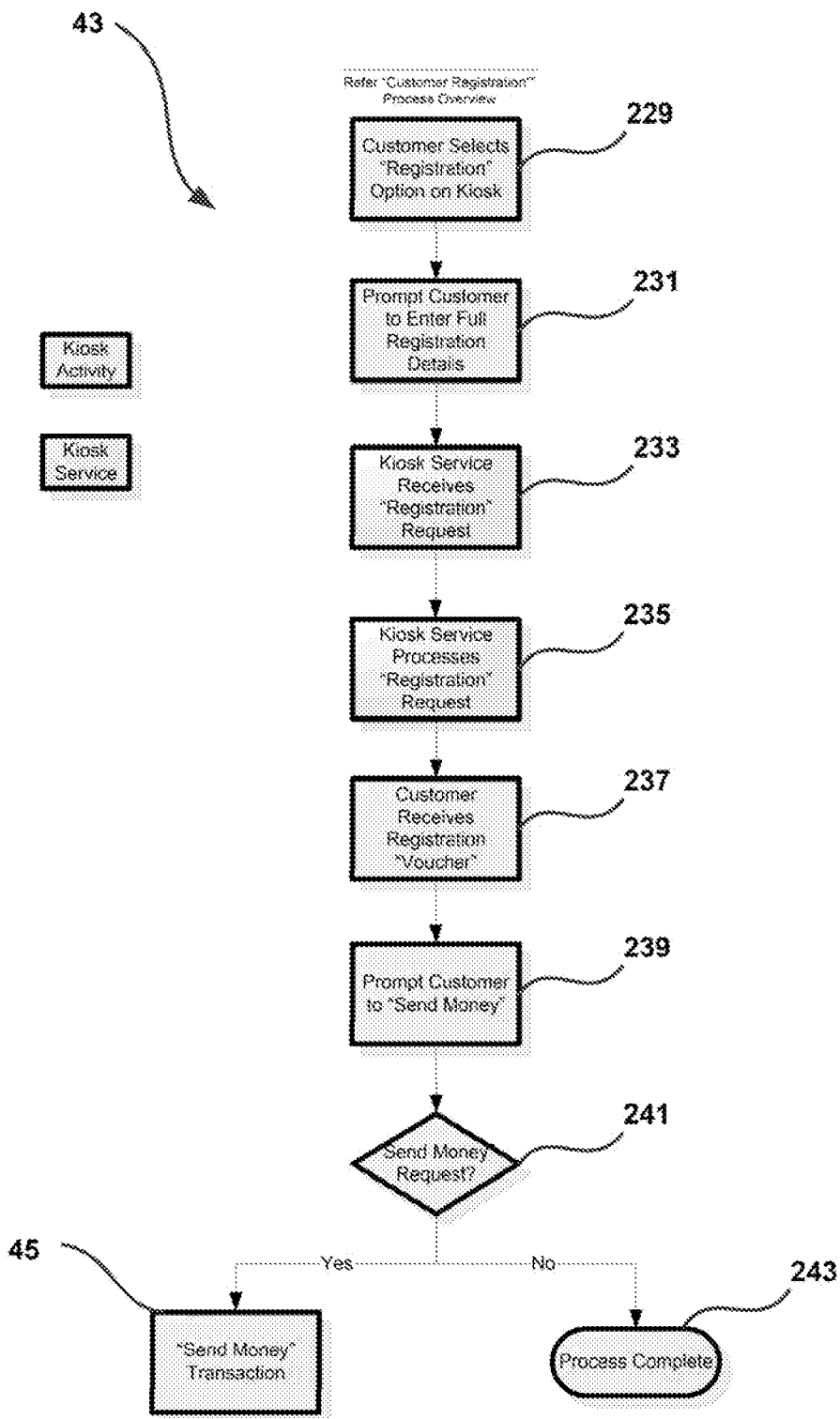
FIG. 7 is a flowchart showing the customer registration process.

Now describing the registration transaction process 43 in more detail, reference is made to FIG. 7 of the drawings. According to this process, the customer selects the registration option at the electronic kiosk at step 229, which then prompts the customer to enter full registration details at 231. The governing host system 21 receives the registration request detail at 233 and processes the request at 235. The kiosk 23 then invokes the printer 24 to print the registration voucher, which is received by the customer at 237. The customer is then prompted to invoke the send money transaction process at 239. Depending upon the response of the customer at 241, the send money transaction process 45 is invoked if the customer responds affirmatively, or alternatively the process is completed at 243 if the customer does not wish to proceed with sending money.

Figure 8:
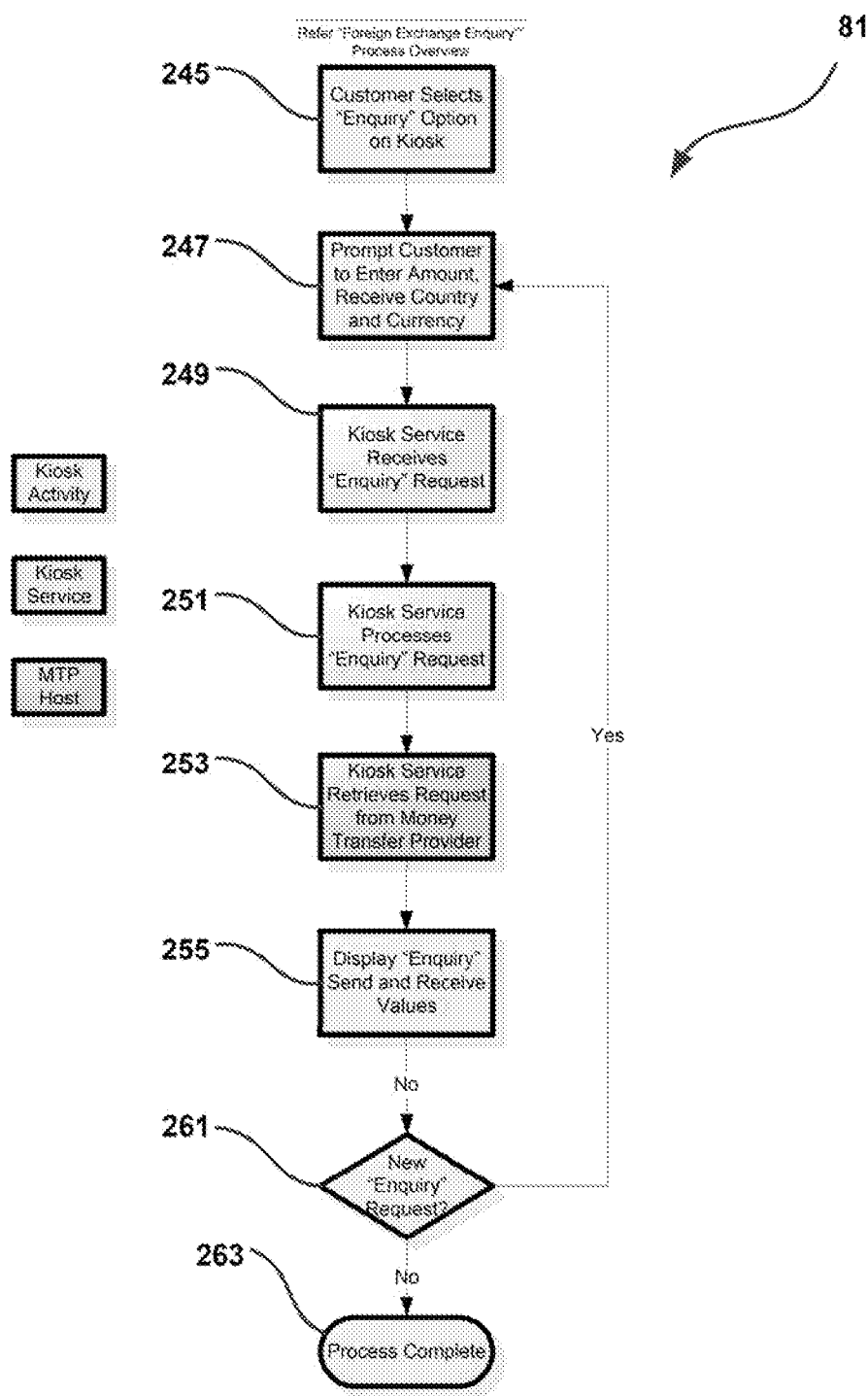
FIG. 8 is a flowchart showing the enquiry transaction process.

The foreign exchange enquiry process 81 is shown in detail at FIG. 8 of the drawings, in response to it being invoked as part of the process described with respect to FIG. 3 of the drawings. It commences with the customer selecting the enquiry option provided at the kiosk at step 245. The kiosk then prompts the customer to enter the amount and the receive country and receive currencies at 247. On entering the same, the governing system host 21 receives the enquiry request at 249 and proceeds to process same at 251 by communicating with the money transfer provider 50 to retrieve the relevant information as sought by the enquiry at 253.

On receiving this information, the electronic kiosk 23 displays the enquiry send and receive values at 255 and the customer is prompted as to whether they wish to make a new enquiry request at 261. If the customer responds in the affirmative to making a new enquiry request, the kiosk prompts the customer to enter the send and receive currency amounts at step 247 again, and the process is repeated. If the customer responds declining the new enquiry request, the process is completed at step 263.

Figure 9:
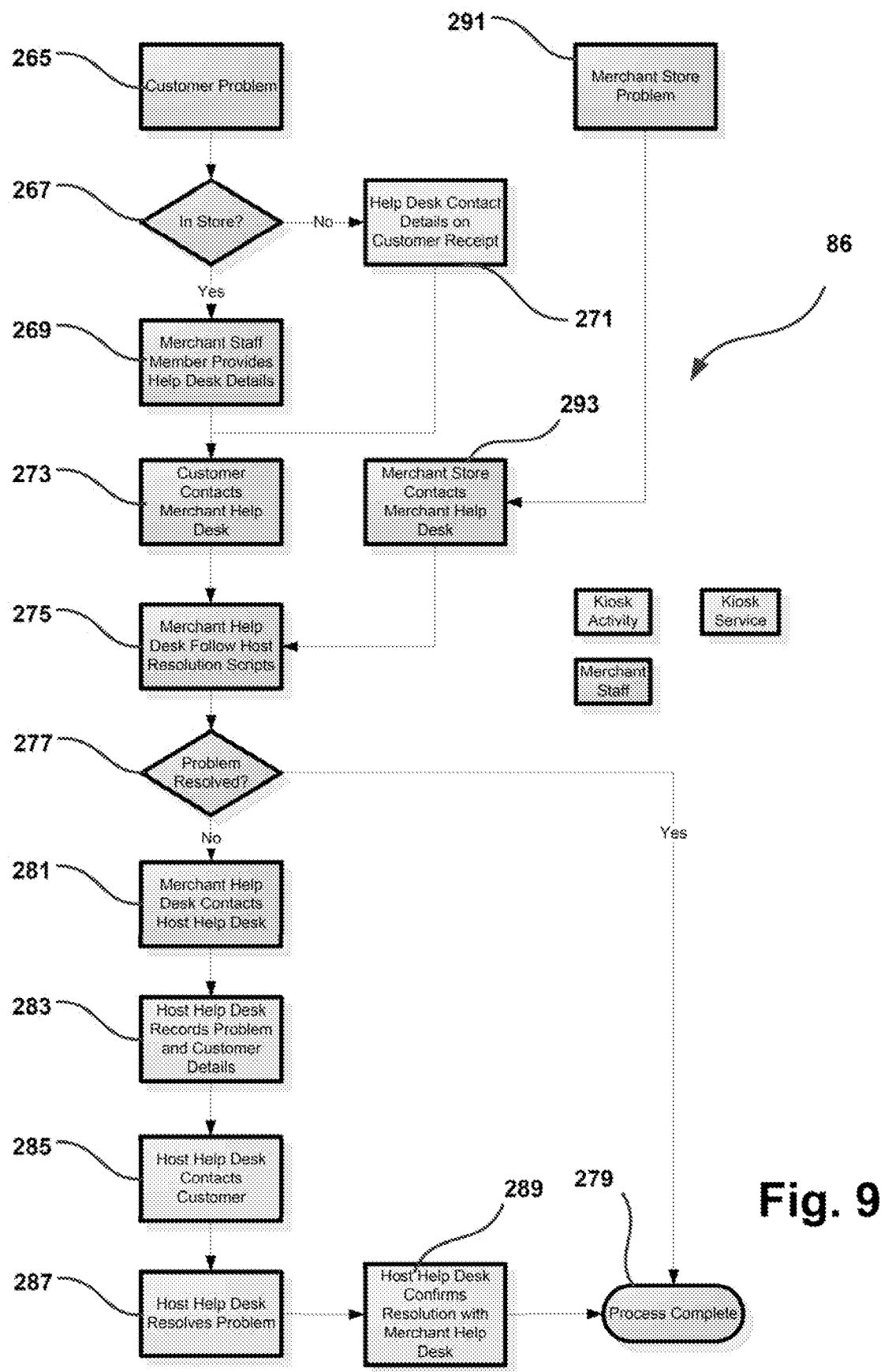
FIG. 9 is a flowchart showing problem resolution transaction process.

The problem resolution transaction process 86 is shown in FIG. 9 of the drawings and arises when the customer has a problem that is brought to the attention of a staff member 15, as indicated at step 265. Depending upon whether the problem occurs in the store or not, as indicated at step 267, there are one of two ways of proceeding. If the problem occurs in the store, the staff member provides details to a helpdesk operator of the merchant at 269 where the store is one of a chain of stores managed by the merchant. If the problem occurs outside of the store, the customer receipt provided by the electronic kiosk 23 provides helpdesk contact details at 271. In either case, the customer ultimately contacts the helpdesk operator of the merchant at 273. The merchant's helpdesk operator then follows a prescribed set of resolution scripts provided to them by the governing host at 275 to allow the merchant to assist the customer and attempt to resolve the problem. If the problem is resolved at 277, then the process is completed at 279. If the problem is not resolved at 277, the helpdesk operator for the merchant contacts the helpdesk operation 30 of the governing host system 21 at 281. The governing host helpdesk operator 30 then records the problem and customer details at 283 and makes contact with the customer at 285 to help resolve the problem at 287. Once the problem is solved the helpdesk operator 30 then confirms resolution of the problem with the helpdesk operator of the merchant at 289, thereby completing the process at 279.

If the problem is sourced with the store of the merchant as shown at 291 as opposed to a customer, the merchant store firstly contacts the helpdesk operator of the merchant at 293 and the helpdesk operator of the merchant follows the resolution scripts provided by the governing host system 21 at 275. Thereafter, the problem resolution transaction process is performed as before, being escalated to the governing host helpdesk provider 30 at the appropriate stage if necessary.

Figure 10:
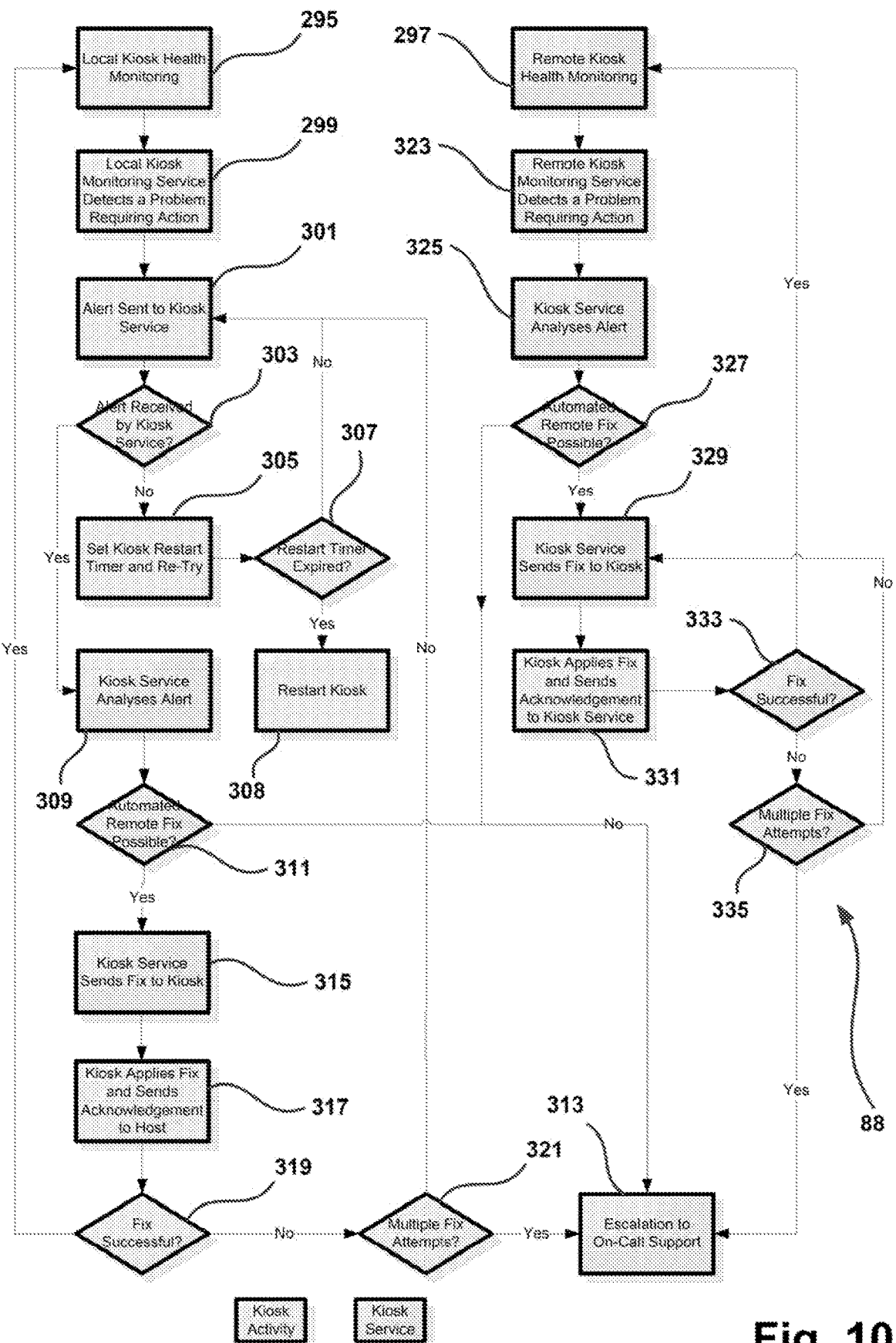
FIG. 10 is a flowchart showing the network management transaction process.

A network management transaction process 88 is shown in detail in FIG. 10 of the drawings and involves a local kiosk help monitoring process 295 and a remote kiosk help monitoring process 297.

The local kiosk help monitoring process 295 involves a local kiosk monitoring service detecting a problem requiring action at 299. In response to same, the kiosk sends an alert to the governing host system 21 at 301. Depending upon whether the alert is received by the governing host system 21 at 303 after a prescribed time, the kiosk sets a restart time and retries the process at 305. If the restart time has not yet expired at 307, another alert is sent to the kiosk service at 301 and the process repeated. If the restart timer has expired at 307, then the electronic kiosk 23 is restarted at 308 in an attempt to invoke communications with the governing host system 21 once more.

If the alert is received by the governing host system 21 at 303, the kiosk service of the governing host system 21 analyses the alert at 309 and automatically invokes a remote fix of the problem if possible at 311. If it is not possible to remotely fix the problem, the issue is escalated to on call support services at 313. On the other hand, if it is possible to fix the problem automatically, the kiosk service sends notification of the fix via the governing host system to the electronic kiosk 23 at 315, and the kiosk applies the fix and sends an acknowledgement to the governing host system 21 at 317. If the kiosk ascertains that the fix is successful at 319, then the process reverts to the local kiosk helpline at step 295 once more. If the fix is not successful at 319, the kiosk ascertains whether multiple fix attempts have been made at 321. If not, then an alert is sent to the kiosk service at step 301 and the process repeated. If there have been multiple fix attempts, the issue is escalated to on call support at 313.

With the remote kiosk help monitoring process at 297, a remote kiosk monitoring service is invoked to detect whether a problem arises requiring action at 323. If so, the kiosk service analyses the alert at 325 and automates a remote fix if possible at 327. If it is not possible to remotely fix the problem automatically, the issue is escalated to on call support at 313. On the other hand, if it is possible to remotely fix the problem, then the kiosk service sends the fix to the electronic kiosk by way of the governing host system 21 at 329. The kiosk, on receiving the fix, applies it and sends an acknowledgement to the kiosk service of the governing host system 21 at 331. If the fix is successful at 333, then the remote kiosk help monitoring process 297 is invoked again for normal remote monitoring. If the fix is not successful at 333, then it is determined whether multiple fix attempts have been undertaken at 335. If they have, then the issue is escalated to on call support at 313. If not, then the kiosk service is invoked to send a fix to the kiosk at 329 once more.

Figure 11:
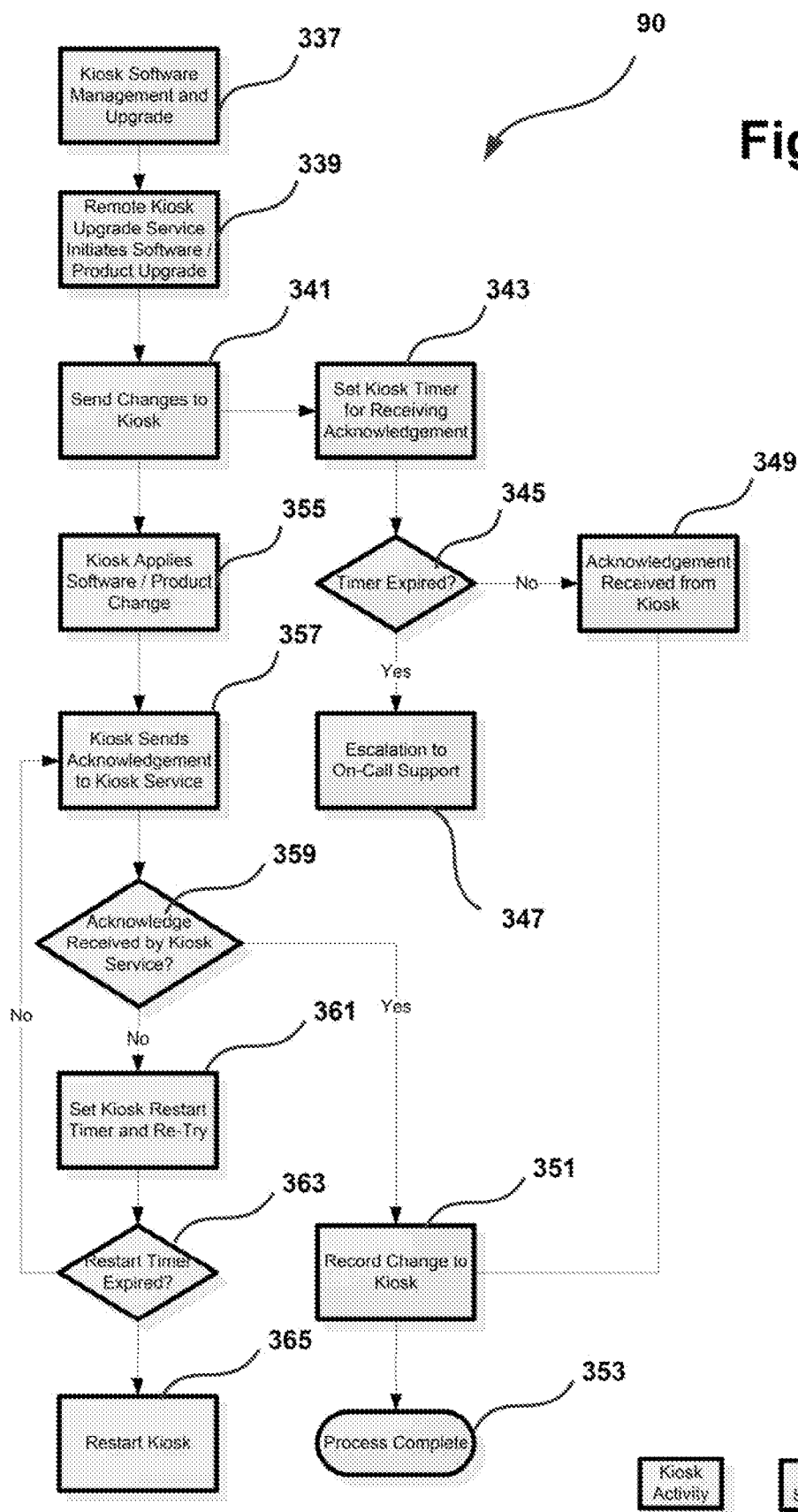
FIG. 11 is a flowchart showing the network upgrade transaction process.

The network upgrade transaction process 90 is shown in FIG. 11 of the drawings. The network upgrade transaction process 90 involves kiosk software management and upgrade performed by the governing host system 21, as indicated at step 337. When invoked, the remote kiosk update service initiates a software/product upgrade at 339 and sends required changes to the kiosk at 341. It then sets a timer at the governing host system for receiving an acknowledgement from the electronic kiosk 23 that the changes have been received by the kiosk at step 343. The process then ascertains whether the timer has expired at 345, and if so, escalates the issue to on call support at 347. If the timer has not expired and an acknowledgement is received from the kiosk at 349, the kiosk service records that the change has been made to the kiosk at 351 and the process is completed at 353. On the kiosk receiving the software/product change it applies same at 355 and sends an acknowledgement to the kiosk service at the governing host system 21 at 357. It then proceeds to check whether an acknowledgement has been received by the kiosk service at 359. If so the kiosk service records the change made to the kiosk at 351 and completes the process at 353. If the acknowledgement is not received, the kiosk sets a kiosk restart timer and retries sending the acknowledgement to the kiosk service at 361. If the restart timer has not expired then the kiosk proceeds with sending the acknowledgement to the kiosk service at 357 and the process is repeated. If the restart timer has expired at 363, it proceeds to restart the kiosk and attempt to establish communications with the governing host system 21 once more at 365.

It should be noted that the present embodiment provides many advantages over other types of money transfer systems. These include:

1. The ability of the governing host 21 to use pattern analysis in order to analyse transactions for suspicious matters, centrally. If there is a suspicious matter detected, a central compliance officer is alerted who takes action in accordance with the risk and regulator policy. Thus only the compliance officer needs to be highly skilled and trained in this regard, and not the staff member 15 of the merchant. This means that staff training can be reduced to skilling in "checking the id" of the customer 19 and reporting anything that is visually suspicious to the help desk.

2. The barcode voucher 31 including a barcode that is a standard point of sale barcode. The staff member 19 of the merchant processes this on the merchant POS terminal 17 as a normal product. This means that cash is recorded going into the till of the merchant as a normal product and can be reconciled as a normal product, which is not the case for money transfers in the past, where a separate till was required.

3. A language handling facility, where:
 a. A file is stored on the governing host 21 from which languages can be selected by the electronic kiosk 23, so that a kiosk screen saver will display advertising only in those selected languages;
 b. A process is provided for allowing a user of the electronic kiosk 23 to select a language displayed on the kiosk screen, wherein after the terms and conditions of the money transfer will be presented in that language; and
 c. Receipts can be presented in the selected language.

4. A process for identifying lost customers from the governing host system's database, and then couponing them to encourage them to return.

5. The fraud and compliance checking configurable rules being embedded in the "kiosk—facilitator device—transaction process" to restrict or alert on transactions based on many sets of rules that can be updated regularly as regulator and retailer policies change on behalf of the merchant and allowing the merchant to configure these rules whenever they want to.

It should be appreciated that in the preferred embodiment, these advantages are essentially achieved by the financial transaction system performing the following process:

(a) Receiving data entered by the user;

(b) Presenting the terms and conditions on the kiosk screen in the customers own language (this provides the first part of a legal "offer");

(c) Disclosing the transaction and having it accepted by the customer in their own language on the electronic kiosk, including exchange rate, fees, taxes and receive money transfer network limitations and any other items that require disclosure (this provides the second part of a legal "offer" and full transparency for the consumer);

(d) The consumer accepting the terms and conditions in their own language (providing the legal "acceptance"); and (e) Validating the entire transaction by the governing host system 21 prior to the customer 19 getting to the counter of the merchant to effect the transaction—if there are problems, the consumer can fix the problems at the electronic kiosk 23 prior to getting to the facilitator device 25, thus ensuring that virtually all transactions go through when the customer gets to the counter.

The above is in contrast to other systems where many transactions are rejected at the counter and the staff have to have a conversation with the customer at the counter to address and rectify the problem.

It should be appreciated that many other processes are performed by the financial transaction system 11 in order to achieve the functions specifically referred to in the description. The implementation of these processes, given the description of the specific processes referred to above, would be reasonably straightforward to a person skilled in the art and will not be described in further detail. Thus, the scope of the present invention is not limited to the specific embodiment described above and other embodiments or variations of financial systems and processes for performing the same are envisaged and form part of the invention.

What is claimed:

1. A system, comprising:
  a program configured on an electronic device having an input interface for receiving transaction information from a customer, the electronic device being independently accessible by the customer to initiate a transaction with a merchant;
  a governing host comprising a database and a server system located remote to the customer, the merchant, and the electronic device, the server system configured to communicate with the electronic device over a network, the database configured to store merchant-configurable transaction rules;
  wherein the electronic device and the governing host are configured to cooperate to complete a first stage of the transaction via a first process comprising:
    via the electronic device (1) receiving details of a transaction request from the customer via the input interface, and (2) communicating the details of the request to the governing host via the network;
    via the governing host, (1) validating the transaction by validating the details of the transaction request against the merchant-configurable transaction rules, and (2) in response to validating the transaction, providing authorization to the electronic device to proceed with a second stage of the transaction; and causing output of a transaction key to the customer;
  a facilitator device configured for completing the second stage of the transaction at a point-of-sale terminal of the merchant and is accessible and operable independently of the electronic device, the facilitator device configured to communicate with the governing host over the network;
  wherein the facilitator device and the governing host are configured to cooperate to complete the second stage of the transaction via a second process comprising:
    via the facilitator device (1) reading a transaction key (2) providing, on a display, instructions regarding a number of steps for a staff member of the merchant to perform to complete the second stage of the transaction, and (3) in response to said other party completing the verification steps, communicating the details of the transaction request to the governing host via the network, and
    via the governing host, (1) communicating the details of the transaction request to the third party provider (2) receiving a reference number from the third party provider over the network, and (3) completing the transaction in response to receiving the reference number.

2. The system of claim 1, wherein the transaction rules comprise fraud check rules, anti-money laundering rules and/or counter-terrorist financing rules.

3. The system of claim 1, wherein the electronic device is an in-store electronic kiosk.

4. The system of claim 1, wherein the transaction is for transferring money to another person or receiving money from another person.

5. The system of claim 1, wherein the transaction is for loading a prepaid card.

6. The system of claim 1, database of the governing host is configured to store a plurality of merchant fraud profiles each associated with a different merchant.

7. The system of claim 6, wherein the governing host is configured to:
  receive an update from the merchant to the merchant-configurable transaction rules, and
  configure the merchant-configurable transaction rules in the database according to the update.

8. The system of claim 1, wherein the merchant-configurable transaction rules comprise fraud limit parameters, and wherein the governing host is configured to halt transactions exceeding the fraud limit parameters.

9. The system of claim 8, wherein the governing host is configured to block the transactions exceeding the fraud limit parameters from proceeding to the second stage without involvement of the staff member.

10. The system of claim 1, wherein the transaction rules include regulatory rules from government authorities relating to compliance requirements.

11. The system of claim 10, wherein, due to the governing host validating the transaction, the instructions provided by the facilitator device to the staff member enable the staff member to complete the transaction without determining compliance of the details of the transaction product request with the regulatory rules and the merchant-configurable transaction rules.

12. The system of claim 1, wherein the money transfer provider is one of a plurality of third party providers, and wherein the governing host is configured to communicate with the plurality of third party providers.

13. The system of claim 1, further comprising the point-of-sale terminal of the merchant, wherein the facilitator device is incorporated into the point-of-sale terminal of the merchant, and wherein, in response to completion of the transaction, the point-of-sale terminal is configured to record an amount of money specified in the details of the send or receive money request as going into a till of the merchant.

14. The system of claim 1, wherein the governing host is configured to:
   log the transaction and a plurality of additional transactions in the database;
   perform a marketing analysis of the logged transactions; and
   provide a report of a result of the marketing analysis.

15. The system of claim 1, wherein the governing host is configured to:
   log the transaction and a plurality of additional transactions in the database;
   perform pattern analysis using the logged transactions;
   identify a suspicion transaction based on a result of the pattern analysis; and
   output an alert to a central compliance officer regarding the suspicious transaction.

16. A process for validating and completing a transaction to be processed by a third party provider, on a governing host including a database and a server system located remotely from the third party provider, the process comprising:
   receiving over a network at the governing host, details of the transaction from a program configured on an electronic device having an interface for receiving transaction information from the customer, the electronic device located remote to the governing host and configured to be used by a customer to initiate the transaction with a merchant;
   accessing, in the database, (i) merchant-configurable fraud check rules configurable by the merchant, (ii) regulatory rules from government authorities relating to transactions, and (iii) compliance requirements of the third party provider;
   validating the details of the transaction against each of the merchant-configurable fraud check rules, regulatory rules, and compliance requirements;
   in response to validating the details of the transaction, providing authorization over the network to the electronic device to proceed with a second stage of the transaction;
   receiving, over the network, a voucher request from a facilitator device configured to be operated at a point-of-sale terminal of the merchant that is located separately from the electronic device and is accessible and operable independently of the electronic device;
   in response to receiving the voucher request, communicating the details of the transaction to the third party provider over the network to complete the transaction;
   receiving a reference number from the third party provider over the network; and
   completing the transaction in response to receiving the reference number.

17. The process of claim 16, further comprising:
   validating at the governing host the voucher request against the merchant-configurable fraud check rules; and
   communicating the details of the transaction to the third party provider in response to validating the voucher request.

18. The process of claim 16, wherein the process further comprises:
   receive at the governing host an update from the merchant to the merchant-configurable fraud check rules, and
   configure the merchant-configurable fraud check rules in the database according to the update.

19. The process of claim 16, further comprising:
   logging the transaction and a plurality of additional transactions in the database of the governing host;
   performing a marketing analysis of the logged transactions; and
   providing a marketing report.

* * * * *